J. J. CAMPODONICO.
TRACTION WHEEL.
APPLICATION FILED DEC. 19, 1918.

1,370,409.

Patented Mar. 1, 1921.
2 SHEETS—SHEET 1.

INVENTOR
John J. Campodonico
BY
Strong & Townsend
ATTORNEYS

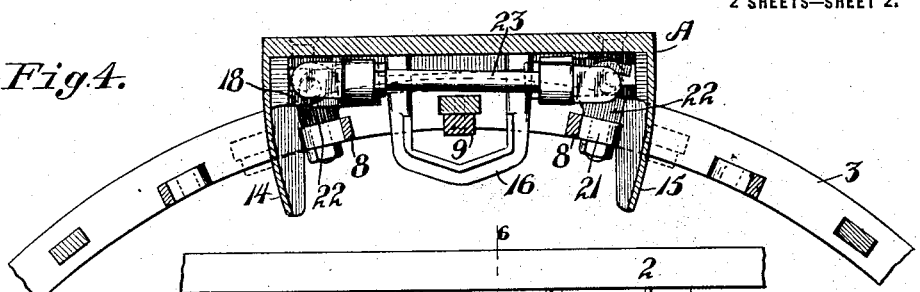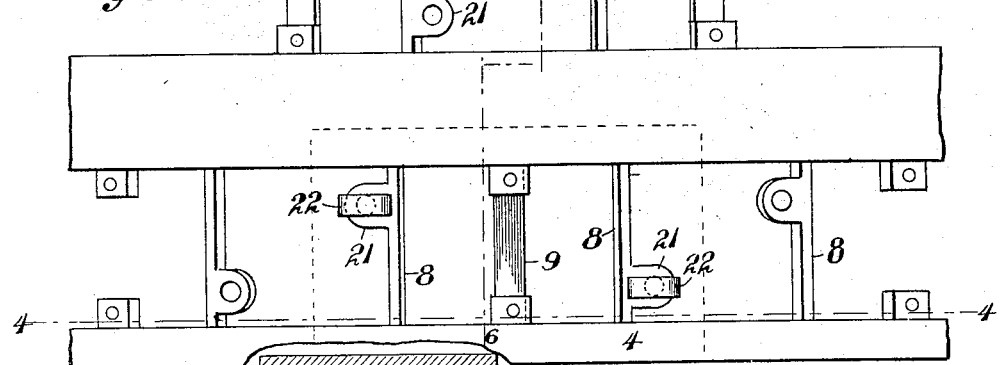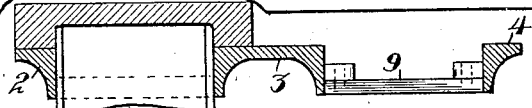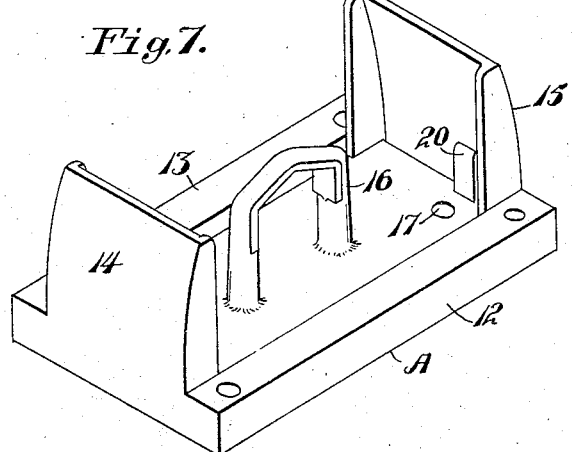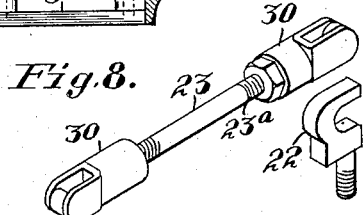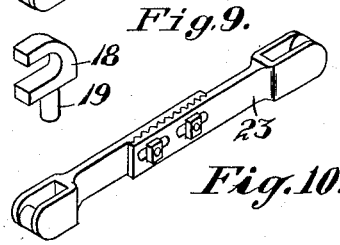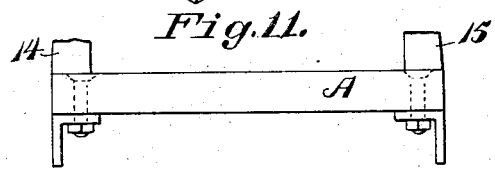

UNITED STATES PATENT OFFICE.

JOHN J. CAMPODONICO, OF SAN FRANCISCO, CALIFORNIA.

TRACTION-WHEEL.

1,370,409.   Specification of Letters Patent.   Patented Mar. 1, 1921.

Application filed December 19, 1918. Serial No. 267,459.

*To all whom it may concern:*

Be it known that I, JOHN J. CAMPODONICO, a citizen of the United States, residing at San Francisco, in the county of San Francisco and State of California, have invented new and useful Improvements in Traction-Wheels, of which the following is a specification.

This invention relates to a traction wheel, and particularly to a tread structure therefor.

One of the objects of the present invention is to provide a wheel for traction engines and other road vehicles which is especially adapted where sandy or yielding soils are encountered.

Another object of the invention is to provide a series of shoe or tread members which are so attached to the rim of the wheel that they are free to oscillate with relation thereto and to present a flat, flexible track over which the wheel will travel.

Another object of the invention is to provide a novel link connection between each shoe and the rim, which serves as a means for securing each shoe to the wheel rim and also serves as a driving connection preventing slipping of the shoes in relation to the rim.

Another object of the invention is to provide means on each shoe for locking the same against twisting or lateral movement with relation to the rim, as will hereinafter be described.

Further objects will hereinafter appear.

The invention consists of the parts and the construction and combination of parts, as hereinafter more fully described and claimed, having reference to the accompanying drawings, in which—

Fig. 4 is a detailed section on line 4—4 of Fig. 5, showing the position of one of the shoes with relation to the rim.

Fig. 5 is an enlarged detail plan view of a portion of the rim.

Fig. 6 is a cross section on line 6—6 of Fig. 5.

Fig. 7 is a perspective view of one of the shoes.

Fig. 8 is a perspective view of one of the contacting links.

Fig. 9 is a perspective view of the hooks to which the links are pivotally attached.

Fig. 10 is a perspective view showing a modified form of the links employed.

Fig. 11 is a detailed view of one of the shoes showing said shoe fitted with grousers.

Figure 1:
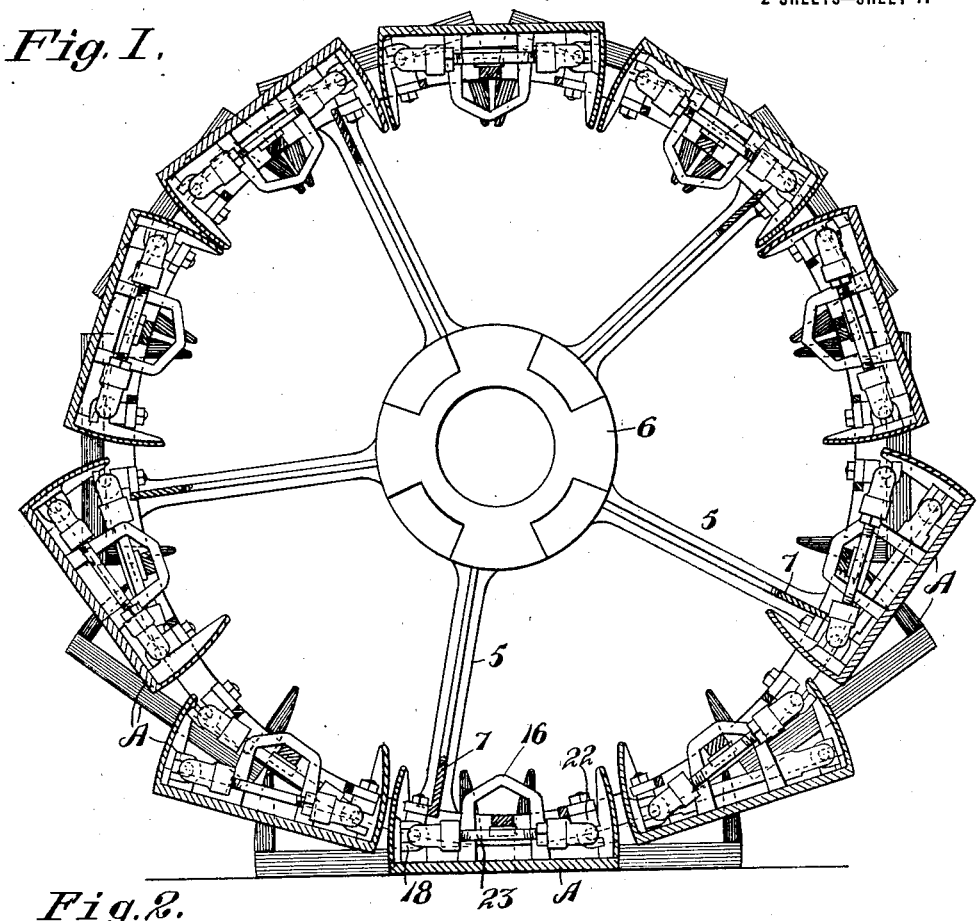
Figure 1 is a side elevation of the wheel partially in section.

Referring to the drawings in detail it will be seen that the wheel consists of three interspaced rim members 2, 3 and 4 supported by spokes 5 and a central hub member 6. The rim sections are connected by a T-head 7 formed on the outer end of each spoke and they are also connected by means of cross bars 8 and 9, the cross bars 8 being in this instance cast integrally with the rim sections, while cross bars 9 are bolted thereto to permit removal and renewal of the same, as will hereinafter be described.

Figure 2:
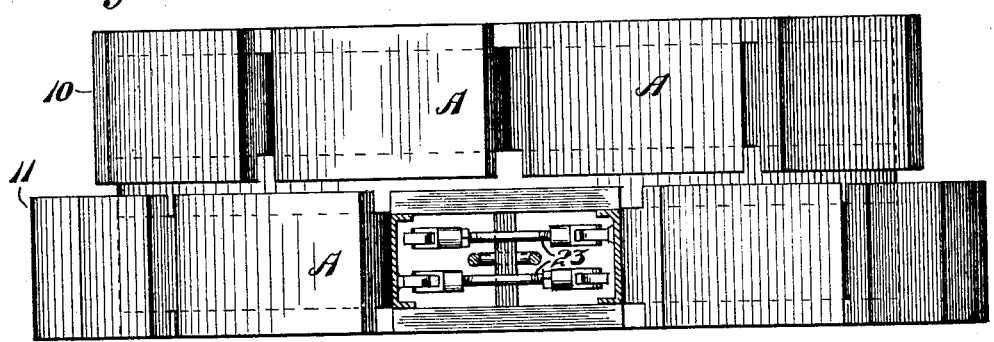
Fig. 2 is a plan view of the same, also partially in section.
Figure 3:
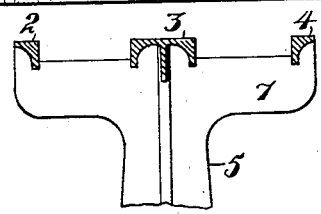
Fig. 3 is a cross section of the wheel rim showing a portion of one of the supporting spokes.

The wheel shown in the present instance is provided with a double tread, generally indicated at 10 and 11 (see Fig. 2), each tread consisting of a plurality of shoes A disposed exterior of the rim sections 2, 3 and 4.

One of the important features of the present invention is the construction of the shoes and the manner of attaching the same to the rim sections of the wheel, and particularly the provision of the connection which permits a free oscillating movement of each shoe with relation to the rims. This is accomplished in the following manner: Each shoe, referring to Figs. 4 and 7, consists of a tread member A on the interior surface of which is formed a pair of track sections 12 and 13, cast integral with the tread section and disposed between the track members 12 and 13 is a pair of curved guide members 14 and 15. Also cast integral with the tread section is a hanger 16 the function of which will hereinafter be described. Formed at each end of each shoe is a drilled hole 17 for the reception of a hook member 18 (see Fig. 9). The hook member is provided with a shank 19 which is inserted in the drilled opening 17 and then riveted over to secure the same therein. The open portion of each hook member 18 is disposed adjacent the guide members 14 and 15 and each guide member is provided with a stop lug 20 which serves the function of a closure for the opened ends of the hooks 18. Formed on each cross bar 8 is a lug 21. These lugs are drilled and tapped to receive hook members such as shown at 22 (see Fig. 9). These hooks when secured in position coöperate with the hooks 18 to permit links 23 to form a connection between each shoe and the rim section of the wheel. There are two links employed in connection with each shoe. These links are disposed in parallelism and are oppositely connected, that is, one end (see Fig. 4) engages the hooks 22 while the opposite end engages one of the hooks 18 carried by the shoe. The link disposed on the opposite side of the shoe is connected with the opposite hook 22 carried by the rim, and the other end of said last named link is connected with the other hook 18 secured to the shoe. This method of connecting the links permits the formation of a postive driving connection between each shoe whether the wheel is traveling ahead or reverse, and it also permits a free oscillating movement of each shoe with relation to the wheel rim sections.

The cross bars 9 are so positioned as to pass through the hanger 16. This is of considerable importance as it limits the outward movement of the links, or in other words the oscillating movement of each shoe with relation to the rim sections, and it furthermore serves as a pick-up which normally supports the weight of the shoes, thereby relieving the links of all strain except that which is exerted if the wheel should have a tendency to slip while traveling over the shoes.

Referring to Fig. 4 it will be seen that the pivotal connections of the hooks 18 and 22 assume an absolute alinement when the shoes reach a horizontal position such as shown. This is of considerable importance as it permits each shoe and link to swing on a true arc with relation to the wheel rims without increasing or decreasing the length of the connecting links or without resorting to the necessity of forming a sliding connection between the shoes and the links.

In actual practice it will be seen that a wheel constructed as here shown consists of a central hub, a plurality of radially disposed spokes and a plurality of rim sections carried thereby, and that a series of shoes are disposed exterior of said rim sections and so connected that they are free to oscillate, each independent of the other. The shoes so arranged will during the rotation of the wheel successively dispose themselves on a horizontal plane in front of the wheel, thus forming a broad track surface upon which the wheel may travel. These shoe or tread sections are again successively picked up at the rear of the wheel by means of the hanger and the cross bars extending therethrough and are thus carried over to be laid in front again.

The double tread structure here shown is so arranged that the shoes are staggered. Three shoes will therefore always engage the ground surface, thus providing a large traction surface for the wheel. This is true even though the wheel rim proper may only engage with one or tow shoes, due to the fact that the links form a positive connection between the rim and the shoes. The traction surface presented is therefore not the surface formed between the rim and the shoes but the actual surface presented by the shoes when engaging the ground.

The wheel here shown is particularly adapted where sandy soils are encountered, as all connections subject to a grinding action are practically eliminated. The wear between the wheel rim sections and the tracks 12 and 13 formed on the respective shoes is only a rolling contact and should therefore be comparatively small. The action between the wheel rim, the links and the shoes is a pulling action and as the oscillating movement of the links in the hook connection is comparatively limited it is obvious that the wear at these points should also be comparatively small.

The only other wear that could possibly take place would be between the hangers and the cross bars and as the only duty of the hangers and the cross bars is to support the weight of the respective shoes when carrying the same over, it is obvious that this should also be almost unnoticeable. In fact no contact is made between the cross bars and the hangers while the shoes are engaging the ground. They can therefore not be subject to any wear except that which occurs when the shoes are freely hung therefrom during the inactive period of each shoe.

Another feature of the present invention is the provision of the guide members 14 and 15. These guide members are so disposed that they will pass between the rim sections of the wheel. They are thus guided by said rim sections and to that extent serve the function of positively securing the shoes against lateral or twisting movement, particularly when making a turn. The arcular form of each guide member 14 and 15 furthermore permits a close positioning of each shoe with relation to the other, thereby eliminating any tendency to a wedging or locking action during the oscillating movement of the shoes which might occur if considerable space were permitted and a rock or other obstruction should enter between the shoes. In fact the guide members 14 and 15 to a certain extent form a housing for the hangers and also the links disposed on each side thereof, thereby positively protecting the same against injury. Any wear that may take place between the links and the hooks 18 and 22 can in this instance be taken up from time to time as the links may be shortened and lengthened by means of the screw rods 23ᴬ shown. These rods are right and left hand threaded and therefore render it easy to extend or shorten the links when conditions may require. Another form of extensible or adjustable link is shown in Fig. 10. In fact the pins at the end of the links when excessively worn may be entirely removed as they are carried by end sections 30 which may be unscrewed and replaced whenever desired. The hooks 18 and 22 may also be replaced from time to time if excessively worn, thus rendering the life of the wheel almost indefinite, as the only parts which may possibly wear can be easily replaced.

While smooth faced shoes are here shown I wish it understood that grousers or corrugations may be provided if desired, similarly that removable track plates may be placed on the track sections 12 and 13 if desired.

I also wish it understood that materials and finish of the several parts employed may be such as the experience and judgment of the manufacturer may indicate and local conditions may require.

Having thus described my invention, what I claim and desire to secure by Letters Patent is—

1. The combination with a traction wheel having connected, axially spaced rim parts, a series of shoes carried thereby and each having a guide member extending inwardly from each end between the rim parts, and means arranged wholly between the end guide members of each shoe for pivotally connecting the latter to the wheel.

2. The combination with a traction wheel having connected axially spaced rim parts, a series of shoes carried thereby and each having a guide member extending inwardly from each end between the rim parts, a pair of links for connecting each shoe to the wheel, and means for pivotally connecting the opposite ends of the links reversely to the wheel and shoe and disposing all the points of pivotal connection in a common plane between the end guide members when the shoe assumes a perpendicular relation to a line extending radially of the wheel.

3. The combination with a traction wheel having connected, axially spaced rim parts, a series of shoes carried thereby and each having a guide member extending inwardly from each end between the rim parts, a U-shaped hook member secured at each end of the shoe in relatively offset relation and with its free ends opposing the adjacent guide member, and a link for each hook member connected at one end to the latter and at its opposite end to the wheel.

4. A traction wheel comprising a pair of axially spaced rim sections, spokes and a hub supporting said rim sections, cross bars connecting said rim sections, a hanger on each cross bar, a shoe secured to each hanger, second cross bars on opposite sides of the first bar provided with relatively offset portions formed with screw threaded openings, a pair of link members, means removably engaged in the threaded openings and to which the link members are pivotally attached at their opposite ends, a pivotal connection between the other end of each link and each shoe, said links forming a driving connection between each shoe and the rims and also permitting an oscillating movement of each shoe and simultaneously serving as a means for limiting said oscillating movement.

5. The combination with the rim of a traction wheel of a series of shoes disposed exterior of the rim and adapted to form a track therefor, a pair of links pivotally attached at their opposite ends to the rim and at their other ends to the shoes, said links forming a driving connection between the shoes and the rim and also permitting an oscillating movement of each shoe with relation to the rim, an arcuate guiding member on each end of the shoe adapted to substantially contact with the adjacent guiding member of the adjoining shoe, and pockets formed in the rim of the wheel and adapted to receive said guiding members.

6. The combination with the rim of a traction wheel of a series of shoes disposed exterior thereof and adapted to form a track for the wheel and a pair of links connecting each shoe to the rim, said links having their opposite ends pivotally attached to the rim and their other opposite ends pivotally attached to the shoes, said pivotal connections on the rim and on the shoe adapted to form an alinement when the shoe assumes a horizontal position with relation to the ground and the wheel.

7. The combination with the rim of a traction wheel of a series of shoes disposed exterior thereof and adapted to form a track for the wheel and a pair of links connecting each shoe to the rim, said links having their opposite ends pivotally attached to the rim and their other opposite ends pivotally attached to the shoe, said pivotal connections on the rim and on the shoe adapted to form an alinement when the shoe assumes a horizontal position with relation to the ground and the wheel, and means for increasing and decreasing the length of each link.

8. A traction wheel comprising a pair of interspaced rim sections, spokes and a hub supporting said rim sections, cross bars connecting said rim sections, a hanger on each cross bar having angular portions successively engageable therewith to permit enlarged pivotal movement of the hanger, a shoe secured to each hanger and a guide member formed on each end of each shoe adapted to pass between the rim sections to secure each shoe against lateral or twisting movement with relation thereto.

9. A traction wheel comprising a pair of interspaced rim sections, spokes and a hub supporting said rim sections, cross bars connecting said rim sections, a hanger on each cross bar, a shoe secured to each hanger, a pair of link members pivotally attached, one to each rim section and at their opposite ends, a pivotal connection between the other end of each link and each shoe, said links forming a driving connection between each shoe and the rims and also permitting an oscillating movement of each shoe, said rim and shoe pivotal connections adapted to aline when each shoe assumes a horizontal position on the ground with relation to a vertical line drawn through the center of the wheel and a curved guiding member on each end of each shoe adapted to extend inwardly between the rim sections, said guiding members being sufficiently long to guide each shoe regardless of its position with relation to the rims, thereby securing each shoe against lateral or turning movement with relation to the rim, regardless of the position of the shoe with relation thereto.

In testimony whereof I have hereunto set my hand in the presence of two subscribing witnesses.

JOHN J. CAMPODONICO.

Witnesses:
 JOHN H. HERRING,
 W. W. HEALEY.